G. T. WRIGHT.
SELF OILING TRUCK WHEEL.
APPLICATION FILED NOV. 5, 1918.

1,310,229. Patented July 15, 1919.

Witnesses
George T. Wright
by Edward E. Longan
Atty.

UNITED STATES PATENT OFFICE.

GEORGE T. WRIGHT, OF MARISSA, ILLINOIS.

SELF-OILING TRUCK-WHEEL.

1,310,229.　　　　　Specification of Letters Patent.　　Patented July 15, 1919.

Application filed November 5, 1918. Serial No. 261,173.

*To all whom it may concern:*

Be it known that I, GEORGE T. WRIGHT, citizen of the United States, and resident of Marissa, Illinois, have invented certain new and useful Improvements in Self-Oiling Truck-Wheels, of which the following is a specification containing a full, clear, and exact description, reference being had to the accompanying drawings, forming a part hereof.

My invention relates to improvements in "self-oiling truck wheels" and has for its object a wheel composed of two sections, which are forced together, thereby forming substantially, a wheel of unit construction, which has an oil chamber surrounding the hub of the wheel and a wick for conducting the oil from the oil chamber to the axle. A further object is to construct a truck wheel which is composed of two parts, each part being cast separate and thus obviating the use of a core. It has been found that in the construction of truck wheels of the present type, that it is necessary to use a baked core to form the oil chamber around the hub, and afterward removing as much of this core as possible through openings formed in the oil chamber. In removing the baked core, it is impossible to get all of the sand out of the oil chamber and that part of the core sand, which remains partially burnt into the metal, will become loosened by the jolting and the action of the oil and gradually get between the hub and the axle, scoring both and shortening the life of both the wheel and the axle.

Figure 1:
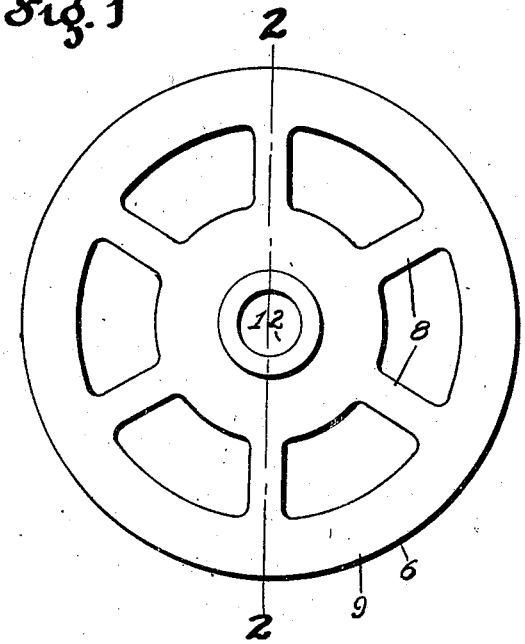
Figure 1 is an inside face view of my wheel.
Figure 2:
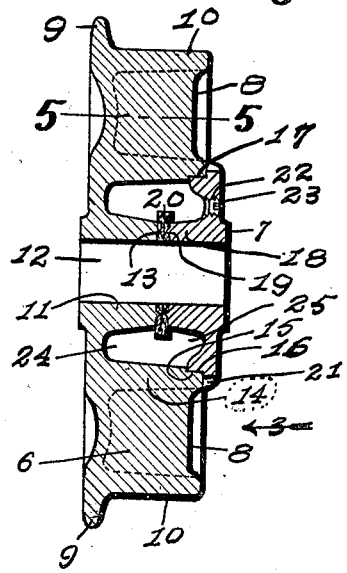
Fig. 2 is a cross-sectional view taken on the line 2—2 of Fig. 1.
Figure 3:
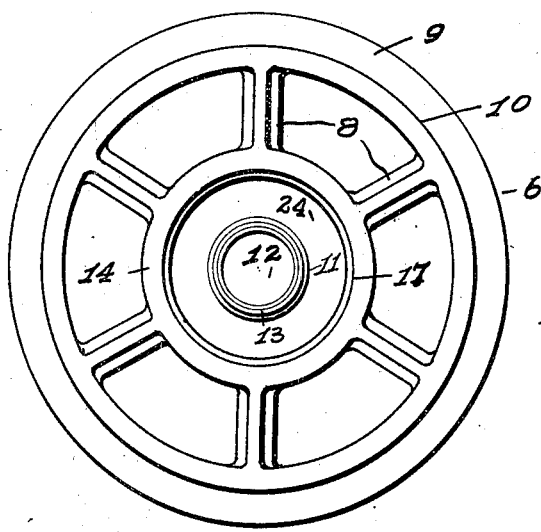
Fig. 3 is an outside face view of the tread member looking in the direction as indicated by the arrow 3 in Fig. 2.
Figure 4:
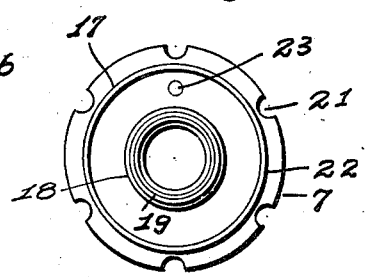
Fig. 4 is an inside view of the hub-insert.
Figure 5:
Fig. 5 is a cross-sectional view of one of the spokes taken on the line 5—5 of Fig. 2.

In the construction of my device, I provide a tread member 6 and a hub-insert 7, the tread member 6 being provided with spokes 8, a flange 9, a tread 10 and a partial hub 11. This partial hub is provided with a bore 12, which fits over the axle of a truck. The hub 11 is further provided with a V-shaped annular projection 13. Between the hub 11 and the tread 10, I provide a projection 14, its inner surface 15, being counterbored for a portion of its distance as indicated by the numeral 16. Between the projection 14 and the tread 10, the spokes 8 are located. These are preferably made T-shaped, see Fig. 5, so as to form a support for the tread.

The hub-insert 7 is provided with a turned portion 17, which is adapted to fit within the counter-bore 16, and is forced therein by hydraulic pressure, thus forming a substantially solid wheel.

The hub part 18 of the hub-insert 7 is provided on its interior face with an annular projection 19, which is of the same diameter as the projection 13 and between these two projections and before the parts are forced together, is placed a ring of absorbent material 20; the projections 13 and 18 tending to clamp the ring between the hubs and to prevent any shifting thereof.

The hub-insert 7 is provided on its periphery with a series of semi-circular depressions 21, the purpose of which is to act as guides when the same is placed in a jig for boring the hub. The hub-insert is further provided with a screw-threaded opening 22 in which the plug 23 is seated, this screw-threaded opening and plug being for access to the oil chamber formed around the hubs 11 and 18.

By the use of my device, it will be seen that the wheel is cast in two parts and no cores are necessary and that each part, especially the oil chamber, can be thoroughly cleansed, so that no molding sand will remain in the chamber. Furthermore time in manufacture can be saved, inasmuch as two men can work on one wheel at the same time, and. after the same is put together, it will be just as solid and secure as if it were cast out of one piece of metal.

The portion 6 is provided with a circular recess 24 which is formed in the casting in this portion of the wheel, and the hub-insert 7 is also provided with a circular recess 25 and when the insert is pressed in position, these two recesses 24 and 25 constitute and form the oil chamber surrounding the hub, into which the ring of absorbent material 20 projects and feeds the oil from said chamber to the axle, and at the same time this wick will prevent any foreign substance, which may possibly pass into the oil chamber or reservoir through the opening, from coming in contact with the axle.

Having fully described my invention, what I claim is:

1. A self-oiling truck wheel cast in two parts and adapted to be pressed one within the other and held together by friction only, each part being provided with an axle bore and with a recess adapted to form an oil tight chamber when the parts are pressed together, except adjacent said bores, and a ring of absorbent material clamped between said parts, said ring projecting into the oil chamber formed by the parts and performing the function of conducting the oil from said chamber to the axle bores.

2. A self-oiling truck wheel cast in two parts and adapted to be united by being pressed together, each part being provided with a recess or channel adapted, when united, to form an oil chamber, an axle bore formed in each part, a sharpened clamping flange formed on each part, and a ring of absorbent material located between the parts and held therebetween by the sharpened flange.

3. A self-oiling truck wheel cast in two separate parts, each part being of integral formation and adapted to be pressed one within the other, a recess formed within each part so as to form an oil chamber when the parts are pressed together, each part being provided with an axle bore, a pair of concentric V-shaped rings surrounding the axle bore, a ring of absorbent material placed around the axle bore and held in position by the V-shaped projections, said ring of absorbent material projecting into the oil chamber formed by the parts and acting as a wick for conducting the oil from the oil chamber to the axle for lubricating the same.

4. A self-oiling truck wheel cast in two parts each part being of unit construction and one adapted to be pressed within the other and held together by friction only, a hub projection formed on each part, said hub projections being provided with an axle bore and with a V-shaped edge, an oil tight chamber surrounding and adjacent said hub projections, said chamber being oil tight except adjacent the inner ends of said projections, and a ring of absorbent material clamped between the projections and extending into the oil chamber for conducting the oil from said chamber to the axle bores.

In testimony whereof, I have signed my name to this specification, in presence of two subscribing witnesses.

GEORGE T. WRIGHT.

Witnesses:
T. M. MEEK,
JAMES F. WYLIE.

Copies of this patent may be obtained for five cents each, by addressing the "Commissioner of Patents, Washington, D. C."